(12) United States Patent
Haccius

(10) Patent No.: US 12,341,573 B2
(45) Date of Patent: Jun. 24, 2025

(54) METHOD AND COMMUNICATION DEVICE FOR COMPENSATING DOPPLER EFFECTS IN RECEIVED WIRELESS COMMUNICATION SIGNALS

(71) Applicant: Continental Automotive Technologies GmbH, Hannover (DE)

(72) Inventor: Christopher Georg Haccius, Regensburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 180 days.

(21) Appl. No.: 17/909,107

(22) PCT Filed: Mar. 4, 2021

(86) PCT No.: PCT/EP2021/055466
§ 371 (c)(1),
(2) Date: Sep. 2, 2022

(87) PCT Pub. No.: WO2021/175993
PCT Pub. Date: Sep. 10, 2021

(65) Prior Publication Data
US 2023/0098295 A1 Mar. 30, 2023

(30) Foreign Application Priority Data

Mar. 6, 2020 (DE) ...................... 10 2020 202 890.7

(51) Int. Cl.
*H04B 7/01* (2006.01)
*H04L 27/00* (2006.01)

(52) U.S. Cl.
CPC ........... *H04B 7/01* (2013.01); *H04L 27/0014* (2013.01); *H04L 2027/0026* (2013.01)

(58) Field of Classification Search
CPC .............................. H04B 7/01; H04L 27/0014
See application file for complete search history.

(56) References Cited

U.S. PATENT DOCUMENTS

| 6,850,505 | B1 | 2/2005 | Christer |
| 10,454,533 | B1 | 10/2019 | Kogiantis et al. |

(Continued)

FOREIGN PATENT DOCUMENTS

| CA | 2512271 A1 | 7/2004 |
| CN | 1382335 A | 11/2002 |

(Continued)

OTHER PUBLICATIONS

Chinese First Office Action dated Sep. 15, 2023 for the counterpart Chinese Patent Application No. 202180017580.3 and translation of same.

(Continued)

*Primary Examiner* — Ronald B Abelson

(57) ABSTRACT

Doppler effects are compensated for in received wireless communication signals. In a receiver a first signal is received, that was transmitted by a transmitter at a first frequency $f_1$ and that was received at a doppler-shifted first frequency $f_1'$ and a second signal, that was transmitted by said transmitter at a second frequency $f_2$ and that was received at a doppler-shifted second frequency $f_2'$ is also received. A frequency difference $f_S$ between the first frequency $f_1$ and the second frequency $f_2$ has a predetermined value. Based on the doppler-shifted first frequency $f_1'$, the doppler-shifted second frequency $f_2'$ and the frequency difference $f_S$, the first frequency $f_1$ is determined for pre-compensating Doppler effects in the received first signal.

16 Claims, 2 Drawing Sheets

(56) References Cited

U.S. PATENT DOCUMENTS

| | | | |
|---|---|---|---|
| 2005/0085249 A1* | 4/2005 | Goldstein | H04L 27/2657 |
| 2006/0251008 A1* | 11/2006 | Wu | H04W 88/08 |
| 2009/0196274 A1* | 8/2009 | Rimini | H04L 27/2657 |
| 2012/0082274 A1* | 4/2012 | Bury | H04L 25/0202 |
| 2012/0212373 A1 | 8/2012 | Garrec et al. | |
| 2015/0219752 A1 | 8/2015 | Lewis et al. | |
| 2015/0241547 A1 | 8/2015 | Opshaug et al. | |
| 2015/0358192 A1 | 12/2015 | Nilsson et al. | |
| 2018/0164422 A1 | 6/2018 | Bilik et al. | |
| 2019/0312634 A1 | 10/2019 | Fourtet et al. | |
| 2020/0314786 A1* | 10/2020 | Zhang | H04B 17/336 |
| 2021/0067290 A1* | 3/2021 | Chen | H04L 5/0033 |

FOREIGN PATENT DOCUMENTS

| | | |
|---|---|---|
| CN | 103929221 A | 7/2014 |
| CN | 104820212 A | 8/2015 |
| CN | 105897633 A | 8/2016 |
| CN | 106501796 A | 3/2017 |
| CN | 107800461 A | 3/2018 |
| CN | 108226918 A | 6/2018 |
| CN | 110226296 A | 9/2019 |
| EP | 0274958 A1 | 7/1988 |
| EP | 1956389 A1 | 8/2008 |
| KR | 101192310 B1 | 10/2012 |
| WO | 2006111277 A1 | 10/2006 |

OTHER PUBLICATIONS

Rappaport et al. "Wireless Communications: Principles and Practice", IEEE Press, 1996.

Chelli et al. "Doppler Shift Compensation in Vehicular Communication Systems", 2015.

Mirza et al. "Maximum Doppler shift frequency estimation using Autocorrelation Function for MIMO OFDM systems", https://www.researchgate.net/publication/259590316, Conference Paper, Jun. 2010.

Van De Beek et al. "On channel estimation in OFDM systems",Conference Paper in Vehicular Technology Conference, 1988, IEEE 38th (vol. 2 1995).

Levanen et al. "Location-aware 5G communications and Doppler compensation for high-speed train networks", Https://www.researchgate.net/publication/318475419, Conference Paper, Jun. 2017.

Alard et al. "Principles of modulation and channel coding for digital broadcasting for mobile receivers", 1987.

Edfors et al. "OFDM Channel Estimation by Singular Value Decomposition", Published in IEEE Transactions on Communications (vol. 46, Issue: 7, Jul. 1998).

Coleri et al. "Channel Estimation Techniques Based on Pilot Arrangement in OFDM Systems", Published in: IEEE Transactions on Broadcasting (vol. 48, Issue: 3, Sep. 2002), pp. 223-229.

Sri Andari Husen et al. "Simple Doppler Compensation for DVB-T", Https://www.researchgate.net/publication/268259135, 2019.

Qiong et al. "Doa and Doppler Frequency Estimation With Sensor Gain and Phase Uncertainties", IEEE Intl. Conf. Neural Networks & Signal Processing, Nanjing, China, Dec. 14-17, 2003.

Office Action dated Oct. 23, 2020 from corresponding German patent application No. 10 2020 202 890.7.

International Search Report and Written Opinion dated May 28, 2021 from corresponding International Patent application No. PCT/EP2021/055466.

Office action dated Mar. 20, 2024 of the counterpart WOCN application 202180017580.3.

Notice of allowance dated Jun. 10, 2024 of the counterpart WOCN application No. 202180017580.3.

* cited by examiner

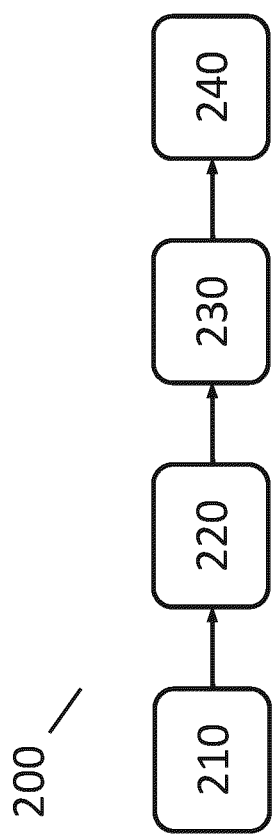

METHOD AND COMMUNICATION DEVICE FOR COMPENSATING DOPPLER EFFECTS IN RECEIVED WIRELESS COMMUNICATION SIGNALS

BACKGROUND

Life in the digital age can barely be imagined without wireless communication. While data rates of wireless communication grow exponentially with the announced 5G, users expect a good communication coverage in ever more challenging environments. Multipath signal propagation and Doppler effects due to mobility of the receivers are known to impact communication. The IEEE 802 standards specify the use of OFDM (Orthogonal frequency-division multiplexing) to efficiently overcome degrading effects of multipath.

With the guard interval, OFDM offers an elegant solution to not only filter out disturbances by delays, but even enhance the signal quality by including the delayed signals. In contrast to the temporal delay of echoes, Doppler effects introduce a shift in frequency domain by the Doppler frequency f_D. This Doppler frequency is directly related to the speed of both communication partners and the velocity of the communication signal. For a transmitted carrier frequency f_0, a signal velocity c, a velocity of transmitter v_Tx and a velocity of receiver v_Rx the observable Doppler Frequency for the receiver is given by $$f_D = \left(1 - \frac{c + v_{Rx}}{c - v_{Tx}}\right) f_0 \quad (1)$$

and the received signal f' is given by $$f' = \left(\frac{c + v_{Rx}}{c - v_{Tx}}\right) f_0 \quad (2)$$

The transmitter and receiver velocities $v_{Rx}$ and $v_{Tx}$ are understood to be positive when the communication partners move towards each other and negative when they move away from each other. Also, angular considerations are ignored here.

As the magnitude of $f_D$ increases, the risk of inter carrier interference (ICI) also increases, until at certain velocities the carriers cannot be differentiated clearly any more.

However, approaches known in the art to estimate and equalize the degrading effects of Doppler perform poorly, are too complex for cost-efficient implementation and/or noticeably reduce the available channel capacity.

The objective of the invention is to reduce the degrading effects of Doppler in wireless communication.

BRIEF SUMMARY

The objective of the invention is met by providing a method and a receiver according to the independent claims.

According to a first aspect, a method for compensating Doppler effects in received wireless communication signals is provided, comprising the steps of:
  receiving, in a receiver, of a first signal, that was transmitted by a transmitter at a first frequency $f_1$ and that was received at a doppler-shifted first frequency $f_1'$;
  receiving, in said receiver, of a second signal, that was transmitted by said transmitter at a second frequency $f_2$ and that was received at a doppler-shifted second frequency $f_2'$;
  wherein a frequency difference $f_S$ between the first frequency $f_1$ and the second frequency $f_2$ has a predetermined value;
  determining the first frequency $f_1$ based on said doppler-shifted first frequency $f_1'$, said doppler-shifted second frequency $f_2'$ and said frequency difference $f_S$;
  using said determined first frequency $f_1$ for pre-compensating Doppler effect in said received first signal.

The first signal is transmitted at the first frequency $f_1$ by a transmitter moving with velocity $v_{Tx}$ and received at a doppler-shifted first frequency $f_1'$ by a receiver moving with a velocity $v_{Rx}$.

The doppler-shifted first frequency $f_1'$ may then be calculated as:

$$f_1' = \left(\frac{c + v_{Rx}}{c - v_{Tx}}\right) f_1 \quad (3)$$

Taking the frequency difference $f_S$ with a predetermined value, the second frequency $f_2$ is given by:

$$f_2 = f_1 + f_S \quad (4)$$

When the second signal is transmitted at the second frequency $f_2$ by the same transmitter moving with the velocity $v_{Tx}$ and received at a doppler-shifted first frequency $f_2'$ by the same receiver moving with the velocity $v_{Rx}$, the doppler-shifted first frequency $f_2'$ is given by:

$$f_2' = \left(\frac{c + v_{Rx}}{c - v_{Tx}}\right) f_2 \quad (5)$$

The receiver observes both $f_1'$ and $f_2'$. With the knowledge of relation (4) a linear equation can be solved to compute the Doppler factor D:

$$D = \left(\frac{c + v_{Rx}}{c - v_{Tx}}\right) = \frac{f_1' \cdot f_S}{f_2' - f_1'} \quad (6)$$

Now the first frequency $f_1$ may be determined based on said doppler-shifted first frequency $f_1'$, said doppler-shifted second frequency $f_2'$ and said frequency difference $f_S$:

$$f_2' = D \cdot f_2 \quad (7)$$
$$= D \cdot (f_1 + f_S)$$
$$= D \cdot f_1 + D \cdot f_S$$
$$= f_1' + D \cdot f_S$$
$$\Leftrightarrow D = \frac{f_2' - f_1'}{f_S}$$
$$\Leftrightarrow f_1 = \frac{f_1' \cdot f_S}{f_2' - f_1'}$$

In this, it is assumed that the velocity of the receiver and the transmitter is constant on the time scale of the signal communication.

In one or more embodiments, the said first frequency $f_1$ and said second frequency $f_2$ are carrier frequencies of two respective communication channels. In wireless communication two different frequencies are observable: the data signal is transmitted with a signal frequency (exemplary for LTE the signal frequency has a magnitude of several MHz), and the carrier signal has a carrier frequency (exemplary for LTE the carrier frequency has a magnitude of few GHz). While signal frequencies are dictated by the communication scheme or standard, carrier frequencies can be selected arbitrarily among the available frequency bands. Therefore, it may be advantageous to select the frequencies $f_1$ and $f_2$ as carrier frequencies of two communication channels, which are selected by the communication provider in such a way that equation (4) is fulfilled and frequency difference $f_S$ is known to both communication partners, i.e. the transmitter and the receiver.

In one or more embodiments, the first frequency $f_1$ and the second frequency $f_2$ are in different frequency domains, for example one of said first and second frequency lies in the 2 GHz domain and the other of said first and second frequency lies in the 4 GHz domain.

It can be assumed, that all disturbance on the channel, measurement imprecision and other factors impeding the communication is given by a Noise frequency. The noise has a direct exponential impact on the quality of the Doppler calculation. The larger the noise, the poorer the quality of the Doppler estimation. However, the degrading effect of noise on the communication channel can be counter-balanced by choosing $f_S$ as large as possible.

Using a second signal to counter Doppler effects presents a significant overhead. If the two signals would both be used for communication of the same information, this would indeed be true. However, since only the frequency of the carrier band is relevant, the data or information communicated over the second signal can be used for different purposes.

In one or more embodiments, said first signal and said second signal are both used for transmitting relevant data to said receiver. By transmitting relevant data or information using the second signal, the bandwidth used is increased or even doubled.

In one or more embodiments, said first signal is used for transmitting relevant data to said receiver and said second signal is used for transmitting relevant data to another receiver. By only using the second frequency of the second signal (and not the data transmitted by the second signal), the second signal can be used as for transmitting data to another receiver. In one or more embodiment, the other receiver is also arranged for executing the one or more embodiments of the method for compensating Doppler effects described in this document and the second signal may serve as a first signal for this other receiver when executing the one or more embodiments of the method.

In one or more embodiments, said first signal and said second signal are transmitted time-sliced. By transmitting relevant data or information using the first and the second signal in an alternating way, the bandwidth used remains the same with respect to using only one signal. However, energy consumption and frequency usage may be reduced by alternating between the first and second signal.

In one of more embodiments, information about said predetermined frequency difference $f_S$ is exchanged between said receiver and said transmitter, preferably during an initial handshake of a wireless communication setup procedure. This additional information may be considered as insignificant compared to the data transmitted during a regular communication session.

According to a second aspect, a receiver for a vehicle is provided that is arranged for executing a method according to any of embodiments of the method for compensating Doppler effect as described in this document. Also, a vehicle comprising such a receiver is provided.

According to a third aspect a system for compensating Doppler effects in received wireless communication signals is provided, comprising:
    a receiver according to the independent receiver claim; and,
    a transmitter arranged for transmitting, to said receiver, said first signal at said first frequency $f_1$, said second signal at said second frequency $f_2$ and, optionally, information about said frequency difference $f_S$.

According to a fourth aspect a computer program is provided comprising instructions which, when the program is executed by a computer, cause the computer to carry out the steps of the method of described in this document. Also, a computer-readable medium having stored thereon said computer program is provided.

The working, advantages and embodiments of the receiver, the system, and the vehicle as well as the working, advantages and embodiments of the computer program and computer-readable medium, correspond with the working, advantages and embodiments of the method as described in this document, mutatis mutandis.

BRIEF DESCRIPTION OF THE DRAWINGS

For a more complete understanding of the present invention, reference in the following description is made in to the accompanying drawings in which.

DETAILED DESCRIPTION

Figure 1:
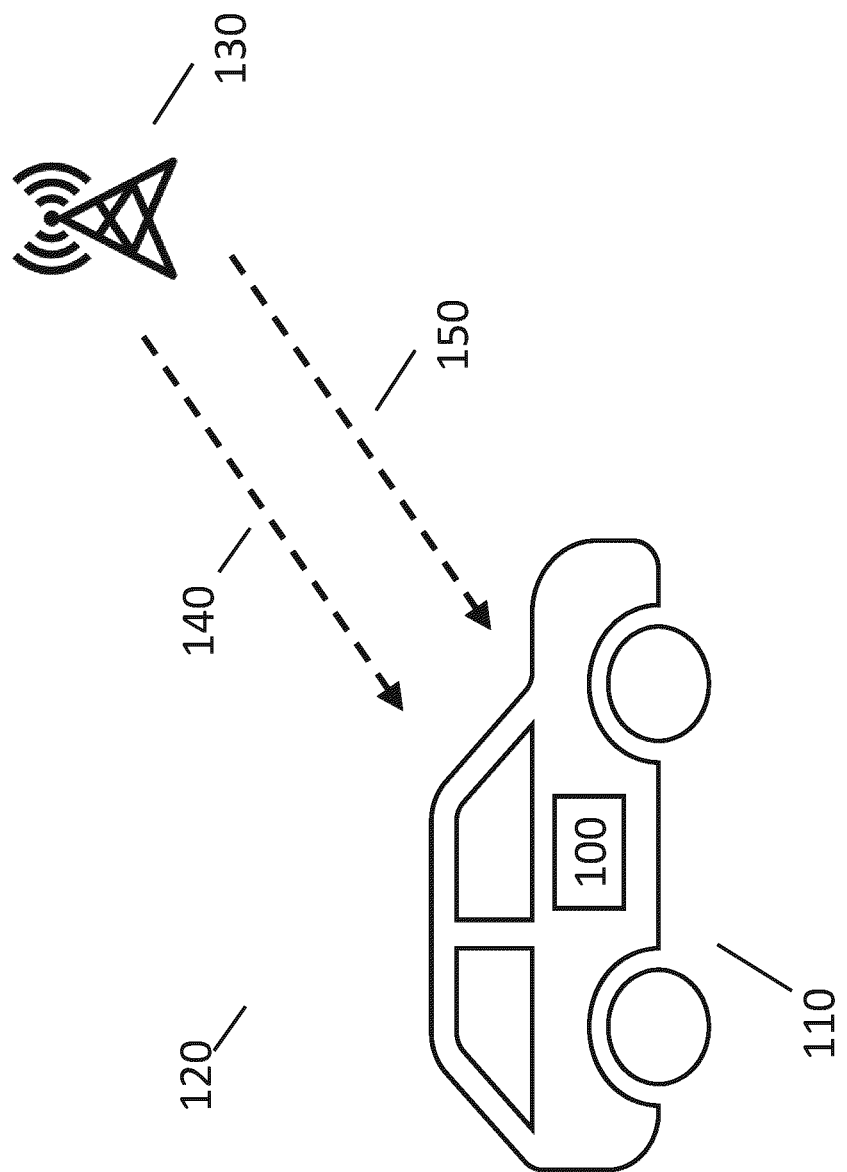
FIG. 1 shows a schematic overview of a receiver, a vehicle and a system according to one or more embodiments of the invention; and, FIG. 2 shows a schematic overview of a method according to one or more embodiments of the invention.

FIG. 1 shows a schematic overview of a receiver 100, a vehicle 110 and a system 120 according to one or more embodiments of the invention as described in this document. Furthermore, in FIG. 1 a transmitter 130 has been indicated.

In one or more embodiments, the receiver 100 may be a communication unit or an Electronic Control Unit (ECU) of a vehicle. In one or more embodiments, the vehicle 110 may be a car, a motorbike, a van, a truck, a bicycle or a scooter. In one or more embodiments, the system 120 comprises (i) the transmitter 130 and (ii) the receiver 100 or the vehicle 110 with the receiver 100. In one or more embodiments, the transmitter may be a base station of cellular network (5G, UMTS, etc.) or a WLAN access point.

The receiver and the transmitter are arranged for exchanging data using a wireless communication protocol, such as 5G, UMTS or WLAN. According to one or more embodiments, the transmitter transmits a first signal 140 at first frequency $f_1$ and a second signal 150 at a second frequency $f_2$. The receiver 100 receives both signals, but because vehicle 110 is moving, the signals are received at a doppler-shifted first frequency $f_1'$ and a doppler-shifted second frequency $f_2'$ respectively.

A frequency difference $f_S$ between the first frequency $f_1$ and the second frequency $f_2$ has a predetermined value. In one or more embodiments, information about the frequency difference $f_S$ is stored in receiver 100. In other embodiments, information about the frequency difference $f_S$ is transmitted from transmitter 130 to receiver 100.

As explained above, the first frequency $f_1$ may be determined or calculated on the basis of the doppler-shifted first frequency $f_1'$, the doppler-shifted second frequency $f_2'$ and the frequency difference $f_S$, preferably in the receiver 100.

The determined first frequency $f_1$ is used for a pre-compensation of the Doppler effect on the first signal, when receiving the first signal at the doppler-shifted first frequency $f_1'$.

In one or more embodiments, a Doppler frequency shift $f_D = f_1' - f_1$ is used or calculated for the pre-compensation. Pre-compensation on the receiver side with a known doppler frequency shift is considered technically trivial and well known in the art.

In one or more embodiments, the second frequency $f_2$ is determined or calculated on the basis of the doppler-shifted first frequency $f_2'$, the doppler-shifted second frequency $f_2'$ and the frequency difference $f_S$, preferably in the receiver 100. The determined second frequency $f_2$ may be used for a pre-compensation of the Doppler effect on the second signal.

In wireless communication two different frequencies are observable: the data signal is transmitted with a signal frequency (when LTE is used, the signal frequency has a magnitude of several MHz), and the carrier signal has a carrier frequency (when LTE is used, the carrier frequency has a magnitude of few GHz). While signal frequencies are dictated by the communication standard such as LTE, carrier frequencies can be selected arbitrarily among the available frequency bands. The available frequency bands are determined by political and regulatory authorities as well as economical competition among the communication providers. However, apart from authorities' constraints there is no technical reason not to select suitable carrier signals and corresponding frequencies for communication.

Therefore, in one or more embodiments, the frequencies $f_1$ and $f_2$ are carrier frequencies of two communication channels, which are selected by the communication provider in such a way that equation $f_2 = f_1 + f_S$ and the frequency difference $f_S$ is known to both communication partners, that is the transmitter and the receiver.

It can be assumed, that all disturbance on the channel, measurement imprecision and other factors impeding the communication is given by the Noise frequency $f_N$, such that $$f_{1,2}' = \left(\frac{c + v_{Rx}}{c - v_{Tx}}\right) f_{1,2} + f_{N_{1,2}} \quad (8)$$

and hence $$f_1 = \left(\frac{f_1' \cdot f_S}{f_2' - f_1' + f_{N_1} - f_{N_2}}\right) \quad (9)$$

The noise $f_N$ has a direct exponential impact on the quality of the Doppler calculation. The larger the noise, the poorer the quality of the Doppler estimation. However, the degrading effect of noise on the communication channel can be counter-balanced by the choice of the frequency difference $f_S$. The quality of the estimation may be improved by choosing the frequency difference $f_S$ as large as possible.

If OFDM subcarrier signals are used, the frequency difference $f_S$ is determined by the OFDM channel width, the number of subcarriers and the width of those individual carriers. Second, the quality of the observed carrier frequencies $f_1$ and $f_2$ (or, respectively, the avoidance of noises $f_{N_1}$ and $f_{N_2}$) has a direct impact on the quality of the estimated Doppler. Measurements of the carrier frequencies of OFDM subchannels are more vulnerable to noise than e.g. measuring carrier frequencies of all subcarriers and calculating a "central OFDM carrier frequency", thus reducing non-systematic disturbances.

Therefore, in one or more embodiments, two distinct, and far apart, channels are used for best results. Those two channels can be taken from separate frequency domains. Exemplarily, the upcoming 5G New Radio standard permits transmission of data in the existing LTE frequency range (600 MHz to 6 GHz) and extends available frequencies by millimeter wave bands (24 GHz to 86 GHz). Due to coverage short term, focus will be on the bands between 600 MHz and 5 GHz, but already coupling channels in the range of 2 GHz with channels in the range of 4 GHz offers the frequency difference $f_S$ of 2 GHz, which is significantly better than the 20 MHz spacing of outer LTE (4 G) OFDM subcarriers.

Using an additional channel to counter Doppler presents a significant overhead. If two channels would be used for communication of the same information this would indeed be true. However, since only the frequency of the carrier band is relevant, the data communicated over this coupled channel can be used arbitrarily.

In one or more embodiments, the first signal and the second signal are both used for transmitting relevant data to said receiver. Together the two bands can transmit twice as much information, thus doubling the bandwidth between the transmitter and receiver, at the cost of overall available channels.

In one or more embodiments, the first signal is used for transmitting relevant data to said receiver and said second signal is used for transmitting relevant data to another receiver. The second channel can provide its carrier frequency as a reference only and can be used to transmit information for a different receiver—which in turn could use the carrier frequency of the first prior channel as a reference.

In one or more embodiments, the first signal and the second signal are transmitted time-sliced. In that way the channels can be shared flexibly between different communication pairs.

In one or more embodiments, information about said predetermined frequency difference $f_S$ is exchanged between said receiver and said transmitter, preferably during an initial handshake of a wireless communication setup procedure. Alternatively, the information about said predetermined frequency difference $f_S$ is exchanged using characteristics of the carrier frequencies. E.g. Phase Keying could be used to ensure the correct baseband channels are used, even when the communicated factor is incorrect due to Doppler.

FIG. 2 shows a schematic overview of a method 200 according to one or more embodiments of the invention. The receiver 100, the vehicle 110 and/or the system 120 of FIG. 1 may be arranged for executing the steps of this method.

The method 200 may comprise the following steps:

Step 210: receiving in a receiver of a first signal, that was transmitted by a transmitter at a first frequency $f_1$ and that was received at a doppler-shifted first frequency $f_1'$;

Step 220: receiving in said receiver of a second signal, that was transmitted by said transmitter at a second frequency $f_2$ and that was received at a doppler-shifted second frequency $f_2'$, wherein a frequency difference $f_S$ between the first frequency $f_1$ and the second frequency $f_2$ has a predetermined value Step 230: determining the first frequency $f_1$ based on said doppler-shifted first frequency $f_1'$, said doppler-shifted second frequency $f_2'$ and said frequency difference $f_S$;

Step 240: using said determined first frequency $f_1$ for pre-compensating Doppler effects in said received first signal.

A computer program may be provided comprising instructions which, when the program is executed by a computer, cause the computer to carry out the steps of one or more embodiments of the method as described in this document. A computer-readable medium may be provided, having stored thereon this computer program.

Furthermore, one or more embodiments may be described by the following: A method, a transmitter, a vehicle and a system for compensating Doppler effects in received wireless communication signals are provided. The method comprises the following steps. In a receiver a first signal is received, that was transmitted by a transmitter at a first frequency $f_1$ and that was received at a doppler-shifted first frequency $f_1'$ and a second signal, that was transmitted by said transmitter at a second frequency $f_2$ and that was received at a doppler-shifted second frequency $f_2'$ is also received. A frequency difference $f_S$ between the first frequency $f_1$ and the second frequency $f_2$ has a predetermined value. Based on said doppler-shifted first frequency $f_1'$, said doppler-shifted second frequency $f_2'$ and said frequency difference $f_S$, the first frequency $f_1$ is determined for pre-compensating Doppler effects in the received first signal.

As will be appreciated by one skilled in the art, aspects of the present invention may be embodied as a system, device, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "unit", "module", "system", "device" or "element".

Functions or steps described in this document may be implemented as an algorithm executed by a microprocessor of a computer. Furthermore, aspects of the present invention may take the form of a computer program product embodied in one or more computer readable medium(s) having computer readable program code embodied, e.g., stored, thereon.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A method for compensating Doppler effects in received wireless communication signals, comprising the steps of:
   receiving in a receiver of a first signal, that was transmitted by a transmitter at a first frequency $f_1$ and that was received at a doppler-shifted first frequency $f_1'$;
   receiving in said receiver of a second signal, that was transmitted by said transmitter at a second frequency $f_2$ and that was received at a doppler-shifted second frequency $f_2'$;
   wherein a frequency difference $f_S$ between the first frequency $f_1$ and the second frequency $f_2$ has a predetermined value;
      determining the first frequency $f_1$ based on said doppler-shifted first frequency $f_1'$, said doppler-shifted second frequency $f_2'$ and said frequency difference $f_S$;
      using said determined first frequency $f_1$ for pre-compensating Doppler effects in said received first signal;
   wherein information about said predetermined frequency difference $f_S$ is exchanged between said receiver and said transmitter, during an initial handshake of a wireless communication setup procedure.

2. The method according to claim 1, wherein said first frequency $f_1$ and said second frequency $f_2$ are carrier frequencies of two respective communication channels.

3. The method according to claim 1, wherein said first frequency $f_1$ and said second frequency $f_2$ are in different frequency domains, for example one of said first and second frequency lies in the 2 GHz domain and the other of said first and second frequency lies in the 4 GHz domain.

4. The method according to claim 1, wherein said first signal and said second signal are both used for transmitting relevant data to said receiver.

5. The method according to claim 1, wherein said first signal is used for transmitting relevant data to said receiver and said second signal is used for transmitting relevant data information to another receiver.

6. The method according to claim 1, wherein said first signal and said second signal are transmitted time-sliced.

7. A receiver for a vehicle, arranged for compensating Doppler effects in received wireless communication signals by performing operations comprising:
   receiving in a receiver of a first signal, that was transmitted by a transmitter at a first frequency $f_1$ and that was received at a doppler-shifted first frequency $f_1'$;
   receiving in said receiver of a second signal, that was transmitted by said transmitter at a second frequency $f_2$ and that was received at a doppler-shifted second frequency $f_2'$;
   wherein a frequency difference $f_S$ between the first frequency $f_1$ and the second frequency $f_2$ has a predetermined value;
      determining the first frequency $f_1$ based on said doppler-shifted first frequency $f_1'$, said doppler-shifted second frequency $f_2'$ and said frequency difference $f_S$;
   using said determined first frequency $f_1$ for pre-compensating Doppler effects in said received first signal, wherein information about said predetermined frequency difference $f_S$ is exchanged between said receiver and said transmitter, during an initial handshake of a wireless communication setup procedure.

8. A system for compensating Doppler effects in received wireless communication signals, comprising:
   a receiver according to claim 7; and,
   a transmitter arranged for transmitting, to said receiver, said first signal at said first frequency $f_1$, said second signal at said second frequency $f_2$ and information about said frequency difference $f_S$.

9. The receiver according to claim 7, wherein said first frequency $f_1$ and said second frequency $f_2$ are carrier frequencies of two respective communication channels.

10. The receiver according to claim 7, wherein said first frequency $f_1$ and said second frequency $f_2$ are in different frequency domains, for example one of said first and second frequency lies in the 2 GHz domain and the other of said first and second frequency lies in the 4 GHz domain.

11. The receiver according to claim 7, wherein said first signal and said second signal are both used for transmitting relevant data to said receiver.

12. The receiver according to claim 7, wherein said first signal is used for transmitting data to said receiver and said second signal is used for transmitting information to another receiver.

13. The receiver according to claim 7, wherein said first signal and said second signal are transmitted time-sliced.

14. A vehicle comprising a receiver arranged for compensating Doppler effects in received wireless communication signals by performing operations comprising:

receiving in a receiver of a first signal, that was transmitted by a transmitter at a first frequency $f_1$ and that was received at a doppler-shifted first frequency $f_1'$;

receiving in said receiver of a second signal, that was transmitted by said transmitter at a second frequency $f_2$ and that was received at a doppler-shifted second frequency $f_2'$;

wherein a frequency difference $f_S$ between the first frequency $f_1$ and the second frequency $f_2$ has a predetermined value;

determining the first frequency $f_1$ based on said doppler-shifted first frequency $f_1'$, said doppler-shifted second frequency $f_2'$ and said frequency difference $f_S$;

using said determined first frequency $f_1$ for pre-compensating Doppler effects in said received first signal, wherein information about said predetermined frequency difference $f_S$ is exchanged between said receiver and said transmitter, during an initial handshake of a wireless communication setup procedure.

15. The vehicle according to claim 14, wherein said first frequency $f_1$ and said second frequency $f_2$ are carrier frequencies of two respective communication channels.

16. The vehicle according to claim 14, wherein said first frequency $f_1$ and said second frequency $f_2$ are in different frequency domains, for example one of said first and second frequency lies in the 2 GHz domain and the other of said first and second frequency lies in the 4 GHz domain.

* * * * *